455-73
FIP8102 OR 2,866,089
X5435Y
SEARCH ROOM
Dec. 23, 1958 C. F. MAASS 2,866,089
HIGH-FREQUENCY RADIO TRANSCEIVER
Filed Nov. 18, 1952
SUBSTITUTE FOR MISSING OR
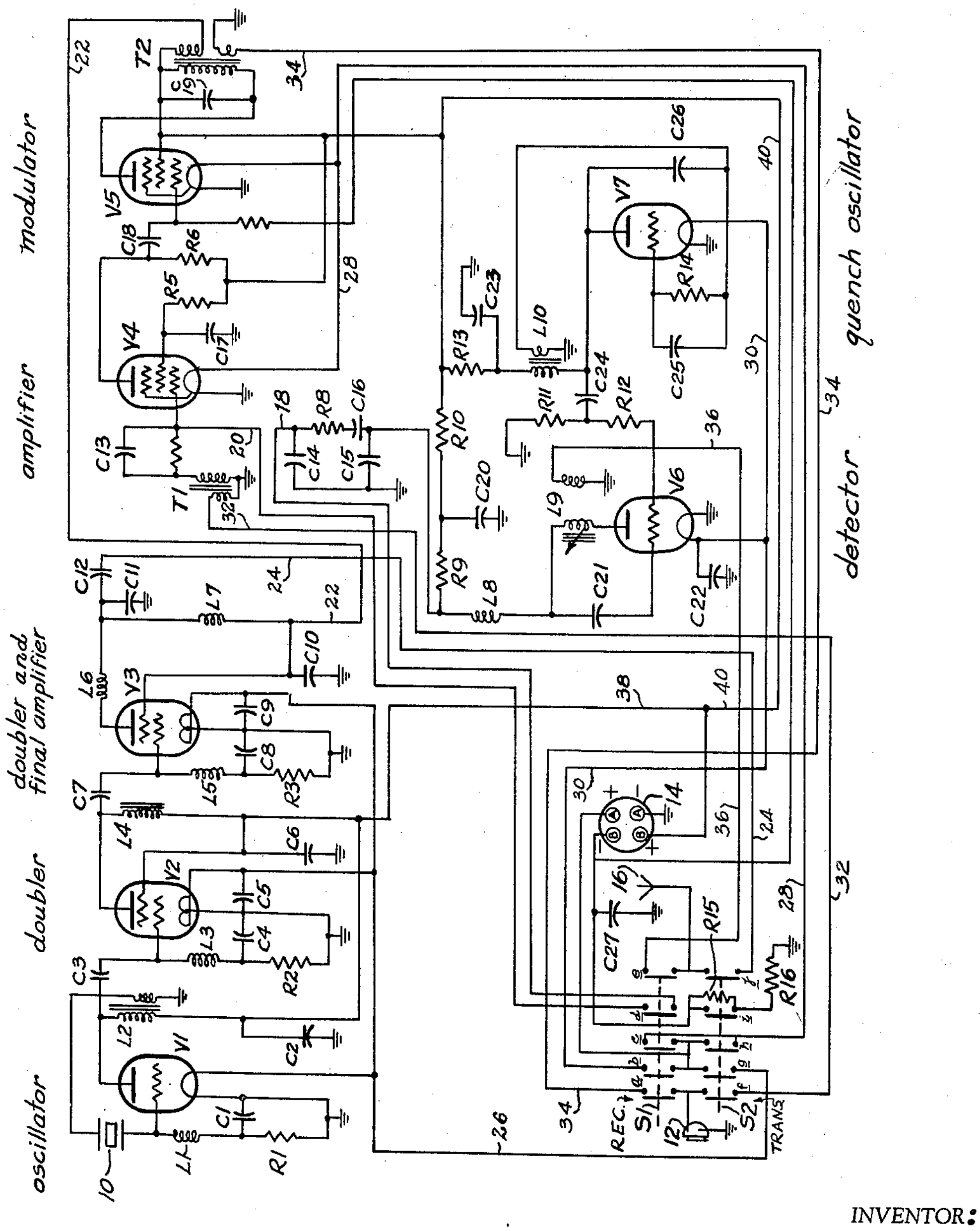
INVENTOR:
CHARLES F. MAASS,
BY Homer R. Montague
ATTORNEY United States Patent Office 2,866,089

Patented Dec. 23, 1958

2,866,089

HIGH-FREQUENCY RADIO TRANSCEIVER

Charles Frederick Maass, Pasadena, Calif., assignor to Hoffman Electronics Corporation, Los Angeles, Calif., a corporation of California Application November 18, 1952, Serial No. 321,096

2 Claims. (Cl. 250—13)

This invention pertains to radio apparatus, and has for its principal object the provision of an extremely compact and light weight radio equipment capable of both transmitting and receiving radio waves.

It is well known, of course, that savings in size and weight can be obtained by designing transceivers so that certain of the tubes, notably the tubes which handle audio frequencies, function both during transmission and reception. It is also common to arrange matters so that the filaments or heaters of those tubes which are used in only one of these conditions are energized only when required, to conserve tube and battery life. Such previous arrangements, however, have generally required rather complicated switch arrangements, in order not only to energize the cathodes of the tubes selectively, but to provide for proper changes in the input and output circuits of the audio frequency portions of the circuitry. It is an object of the present invention to provide a circuit arrangement in which only the input circuit of the audio portion need be switched when changing from transmission to reception, and in which this operation itself is reduced to a simple opening or closing of a single set of contacts.

Another object of the present invention is to provide an improved output arrangement for the final stage of a frequency-doubler used to raise the generated frequency to that desired for transmission. Such output circuits have heretofore been relatively complex due to the difficulty of suppressing the driver frequency which ordinarily appears in the output of the doubler stage along with the doubled frequency desired to be transmitted. The present arrangement satisfies the requirements for suppression of the driver frequency in a very simple manner, which contributes in reducing the size and weight of the entire unit.

A further object of the invention is to provide apparatus of the above type in which the oscillator constituting the source of the energy which is (after frequency multiplication) radiated from the antenna, will be stabilized as to frequency, together with provision of means for ensuring that the circuit will be non-oscillatory when the frequency-controlling crystal is removed from its holder.

The above and other objects and advantages of the invention will best be understood by referring to the following detailed description of a preferred embodiment thereof, taken in connection with the appended drawing, whose single figure is a schematic diagram of the essential parts of the apparatus.

The unit to be described is designed for operation on a single predetermined frequency, which may for example be of the order of 243 megacycles per second. The functions of the various stages of the circuit have been indicated on the drawing by legends, and will now be described broadly and hereinafter in detail as to those portions for which novelty is claimed. The fundmental frequency of the oscillator stage V1 is controlled by the crystal 10, and the output of this stage is fed to the doubler stage V2 whose output is again doubled and amplified in stage V3. Thus, for a carrier frequency of 243 megacycles, the natural frequency of the crystal 10 should be 60.75 megacycles, although the desired frequency can of course be chosen as desired to suit the intended purpose.

During transmission, with "Transmit" switch S2 closed, the combination speaker-microphone 12 is used as a microphone, and its output is conveyed over contacts *f* of switch S2 and lead 32 to the microphone transformer T1 whose output feeds the grid of amplifier stage V4. The output of stage V4 controls the modulator stage V5 which feeds the modulation transformer T2 and hence via lead 22 plate-modulates the carrier output from final doubler amplifier V3. The amplitude modulated output passes over lead 24 to switch contact *j* of switch S2 and thence to the antenna 16. Numeral 14 designates the receptacle for a power supply cable which furnishes heater and plate voltages, for instance from external dry batteries or equivalent source.

As described, the stages V4 and V5 are audio-frequency stages used for modulating the multiplied oscillator output during transmission. These stages are also used for audio amplification during reception, as will now be described.

Stage V6 constitutes a known form of super-regenerative detector, which receives the signals to be detected over lead 36 and contacts *e* of the "Receive" switch S1 from antenna 16. The detected output of this stage passes over lead 18 to the contacts *d* of switch S1, and thence over lead 20 to the grid of amplifier stage V4. Inasmuch as the circuit over lead 32 from this grid to the microphone 12 is now open at contacts *f* of switch S2, only the output of detector V6 is applied to this amplifier. The output of amplifier V4 passes to the grid of modulator stage V5, which now acts as a power amplifier energizing the transformer T2 primary, and thence to the third (grounded) winding of this transformer over lead 34 and contacts *a* of switch S1 to the device 12, which now operates as a receiver or speaker.

It is to be observed that the above arrangement, incorporating two distinct secondary windings in transformer T2, makes it unnecessary to provide for any switch to disconnect the other secondary winding from lead 22 and the final doubler stage V3. The latter stage is inoperative at this time because the filaments of all three tubes V1, V2 and V3 are disconnected from the filament supply during reception at switch S1.

The manner in which switches S1 and S2 control the power supply to the various tubes will now be described. It will be observed that the A— lead at connector 14 is grounded, while the A plus lead extends to one contact of each set *b*, *c*, *g* and *h* of the switches. During reception, when switch S1 is closed, contact *b* and lead 30 energize the filaments of detector V6 and the quench oscillator V7. Contact *c* and lead 28 energize the filaments of the amplifier V4 and the amplifier (modulator) V5. The remaining tubes (V1 to V3) are not energized at this time. When switch S1 is opened and switch S2 closed, for transmission, contact *g* and lead 26 energize the filaments of the oscillator stage V1 and doubler stages V2 and V3, while contact *h* and lead 28 energize the filaments of the amplifier V4 and the modulator V5. The B minus lead at connector 14 is returned to ground through resistors R15 and R16, and switch contacts *i* short-circuit the former during transmission to provide increased plate voltages at this time.

The oscillator stage V1 is of largely conventional construction, including the oscillation transformer L2 whose secondary is connected between grid and ground in series with the crystal 10. In order to provide increased stability of oscillation, and to ensure that oscillations cease when the crystal is removed from its holder, there is provided a choke L1 resonant at a frequency somewhat higher than the crystal itself, this choke being connected between the grid of V1 and the bias resistor R1. In the embodiment being described, this choke has a resonant frequency of 64 megacycles per second, and ensures that when the crystal is removed, the capacitance of its holder is insufficient to allow the circuit to oscillate.

Ordinarily, the use of a simple pi-section matching network between a harmonic multiplier stage (such as V3) and the antenna is not considered feasible, because of the fact that such a matching network allows a considerable portion of the driver voltage to leave the antenna. In this instance, this voltage would be at a frequency one-half of the carrier frequency being employed. In the embodiment shown, the final doubler tank inductance is L6, which forms with the plate-to-cathode capacitance of tube V3, and with the capacitance C11 such a pi-section network. The difficulty is overcome, in the present invention, by incorporating in the plate supply lead for this stage, 22, a choke L7 resonant at a frequency not far above the desired final carrier frequency. For example, such a choke resonant at 250 megacycles may be employed. Such a choke will have a high impedance at the carrier frequency of 243 megacycles, and in effect shorts to ground the driver voltage of 121.5 megacycles, so that none of this driver frequency reaches the antenna over lead 24.

The arrangement just described makes it unnecessary to provide elaborate filters or the like for eliminating the driver frequency from the final doubler output, and thus not only saves circuit complication but reduces the space required which is important in compact portable apparatus. The use of a straight amplifier stage following the doubler, as is occasionally done to eliminate the driver frequency and other harmonics, is also eliminated.

As has been indicated, the detector is of the conventional super-regenerative type, being quenched from the approximately 300 kilocycle oscillator stage V7. L9 is the oscillation transformer for the detector, and L10 the transformer for the quench oscillator.

A practical commercial embodiment of the entire circuit employs the following circuit constants, but it will be understood that these may be varied without departing from the invention:

| | |
|---|---|
| V1, V6, V7 | CK6050 type. |
| V2, V3 | 5851 type. |
| V4 | CK 527AX type. |
| V5 | QF 721 type. |
| C1 | 200 mmfd. |
| C2, C6, C10, C12, C24 | 500 mmfd. |
| C3, C7 | 51 mmfd. |
| C4, C8, C25 | 100 mmfd. |
| C5, C9, C22 | 1000 mmfd. |
| C13 | 10,000 mmfd. |
| C14, C16, C17, C18, C19, C23 | 5,000 mmfd. |
| C15 | 2,700 mmfd. |
| C21 | 40 mmfd. |
| C26 | 820 mmfd. |
| C20 | 20 mfd. |
| C27 | 4 mfd. |
| R1, R10 | 4,700 ohms. |
| R2, R3 | 150,000 ohms. |
| R4 | 4.7 megohms. |
| R5 | 5.6 megohms. |
| R6 | 1.0 megohms. |
| R7 | 2.2 megohms. |
| R8, R12 | 100,000 ohms. |
| R9 | 22,000 ohms. |
| R11, R14 | 47,000 ohms. |
| R13 | 12,000 ohms. |
| R15 | 1,300 ohms. |
| R16 | 270 ohms. |
| L1 | Self-resonant choke—66 mc. |
| L3 | Self-resonant choke—66 mc. |
| L5 | Self-resonant choke—125 mc. |
| L7 | Self-resonant choke—250 mc. |

What is claimed is:

1. In a radio transceiver, a source of carrier frequency energy, an audio amplifier having an input circuit and an output circuit, said output circuit being permanently connected to said source of carrier frequency energy to modulate the same, a combined speaker-microphone device, a thermionic cathode detector of the regenerative type, a quench oscillator for said detector, a switch operable to connect said device to said input circuit and to effect simultaneous energization of said source, and a second switch operable to connect said device to said output circuit, to connect said detector to said input circuit and to effect simultaneous energization of the cathode of said detector and said quench oscillator.

2. In a radio transceiver, a source of carrier frequency energy comprising at least one space discharge device having a filament, an audio amplifier having an input circuit and an output circuit, said output circuit being permanently connected to said source of carrier frequency energy to modulate the same, a combined speaker-microphone device, a regenerative detector comprising at least one space discharge device having a filament, a switch operable to connect said device to said input circuit and to effect simultaneous energization of the filament in the first-named discharge device, and a second switch operable to connect said device to said output circuit, to connect said detector to said input circuit, and to effect simultaneous energization of the filament in the second-named discharge device and said quench oscillator.

References Cited in the file of this patent

UNITED STATES PATENTS

| | | |
|---|---|---|
| 2,018,569 | Pettengil et al. | Oct. 22, 1935 |
| 2,420,740 | Douma | May 20, 1947 |
| 2,503,968 | Root | Apr. 11, 1950 |
| 2,533,493 | Mitchell | Dec. 12, 1950 |
| 2,535,063 | Halstead | Dec. 26, 1950 |
| 2,570,840 | O'Brien | Oct. 9, 1951 |
| 2,613,320 | Panetta | Oct. 7, 1952 |
| 2,632,812 | Cooney | Mar. 24, 1953 |
| 2,692,943 | Reid | Oct. 26, 1954 |

FOREIGN PATENTS

| | | |
|---|---|---|
| 620,010 | Great Britain | Mar. 17, 1949 |